Sept. 23, 1969    J. W. KENNEDY    3,468,038
MATHEMATICAL MODEL
Filed March 30, 1967    3 Sheets-Sheet 1
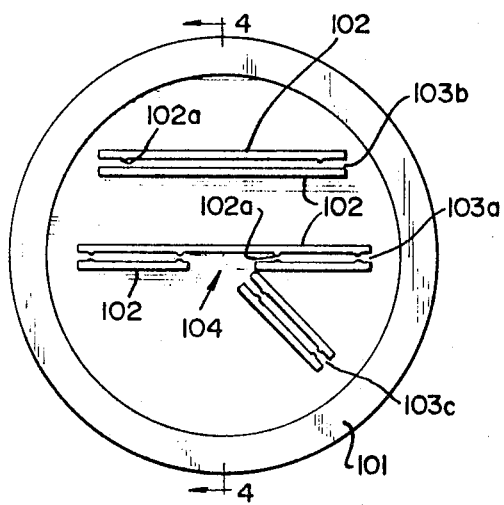
FIG.1
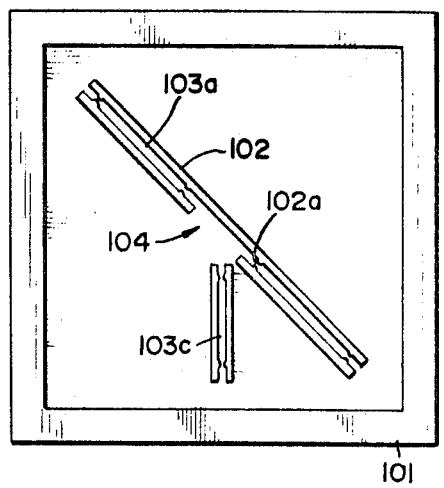
FIG.2
FIG.4
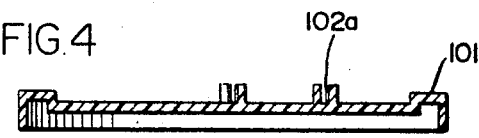
FIG.3

INVENTOR
JOSEPH W. KENNEDY
BY Hofgren, Wegner, Allen,
Stellman & McCord
ATTORNEYS Sept. 23, 1969     J. W. KENNEDY     3,468,038

MATHEMATICAL MODEL

Filed March 30, 1967     3 Sheets-Sheet 3

United States Patent Office 3,468,038
Patented Sept. 23, 1969

3,468,038
MATHEMATICAL MODEL
Joseph W. Kennedy, Oxford, Ohio, assignor to LaPine Scientific Company, a corporation of Illinois
Filed Mar. 30, 1967, Ser. No. 627,069
Int. Cl. G09b 23/04
U.S. Cl. 35—34          6 Claims

ABSTRACT OF THE DISCLOSURE

A set of construction members for student use for constructing and studying terminology, volume and dimensions of forms encountered in solid geometry. Each form is constructed from a base member and a cover which completes the basic form. Partitions are provided which can be mounted within the form and the cover member is a transparent shell so that the partitions can be observed by the student.

Background of the invention

Figure 12A:
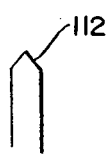

This invention relates to teaching and study aids and more particularly relates to such aids which are useful in the understanding of solid geometric forms.

To many students, solid geometry is a difficult subject to comprehend. Full understanding of the subject as taught from conventional teaching aids requires some ability to visualize three-dimensional or solid forms in space and in relation to each other as well as in relation to plane and linear forms. Conventional teaching methods include pictures and chalk board drawings, but these two-dimensional illustrations can be confusing to the student, resulting in a lack of full understanding of the subject matter being taught.

The invention

The present invention provides a mathematical model system for reenforcing geometry lessons with student participation through student applied geometry experiments. In a more specific aspect, the invention provides a new and useful kit of component parts from which students can assemble basic solid geometric forms and their principal planar sections and from which students can compare the volume, dimensions and sections of such diverse solid geometric forms as pyramids, prisms, cones, cylinders and hemispheres. The components of the kit can include sectioning partitions and are mathematically correct in every detail. They can be assembled in an almost unlimited number of applications to focus attention on areas which may be unclear to the pupil, thereby enabling understanding of the basic shapes and their important intersecting planes.

The present invention can be used in student applied geometry experiments for teaching terminology and concepts of volume, dimensioning and sectioning of solid forms. Preferably the components of the kit permit the construction by students of basic solid forms which are hollow and have a transparent shell wall for observation of the interior. Also, preferably a system is provided for locating and removably mounting partitions within the form so that the principal sections of the form can be studied visually through the transparent shell wall.

While the invention is susceptible of embodiment in many different forms, there is shown in the drawings and will herein be described in detail specific embodiments of the invention with the understanding that the present disclosure is to be considered as an exemplification of the principles of the invention and is not intended to limit the invention to the embodiments illustrated.

Description of the preferred embodiments

Figure 13A:
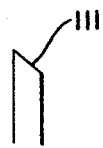

In the drawings, FIGS. 1–3 are plan views of embodiments of base members useful in a kit of the present invention, and FIG. 4 is a section along the line 4—4 of FIG. 1. FIGS. 5–11 illustrate forms of cover members which can be assembled with correspondingly shaped ones of the base members of FIGS. 1–3 to provide basic solid geometric forms. FIGS. 12–26 illustrate various forms of partition members which can be supported within the solid geometric forms and preferably can be located as in the positions illustrating planar sections and even linear axes through the solid geometric forms. FIGS. 12a and 13a are fragmentary views from the top edges of the members of FIGS. 12 and 13 respectively showing beveled edges.

Turning first to the drawings, FIGS. 1, 2 and 3 illustrate a round base member, a square base member and an equilateral triangle base member respectively. As best seen in FIGS. 1–4, each base member includes a peripheral upstanding flange or rim 101 for receiving an open end of one of the shells of FIGS. 5–11.

Each base member also includes at least one partition locating and mounting system in the form of a pair of opposing upstanding flanges 102. Each pair of flanges 102 defines a groove 103 therebetween and has rib elements 102a in the groove for receiving the lower end of a partition as more particularly described hereinbelow. Each base member has a central dissecting groove 103a which is along a diameter of the round base member of FIG. 1, along a diagonal of the square base member of FIG. 2, and along the altitude of the triangle base member of FIG. 3. Additionally, in FIG. 1, a second groove 103b is provided parallel to the groove 103a and lies on a chord of the circular base member. In FIGS. 1 and 2, a mounting goove 103c is provided lying along a radius and center line respectively of the circular and square base members and oriented angularly 45 degrees from the groove 103a. Where the groove 103c is provided, the flange 102 of the groove 103a closest to the groove 103c is provided with a gap at 104 to permit a partition to be mounted in the groove 103c and to be moved snugly against a partition mounted in the groove 103a to illustrate intersecting planes.

Each base member can conveniently be molded from an opaque plastic material as an integral piece including the rim 101 and the grooves 103 defined between the flanges 102 and ribs 102a.

FIGS. 5–11 illustrate the various covers in the form of shells which can be received by their open ends within the peripheral flange 102 on a like-shaped base member of FIGS. 1–3. The shells are of transparent plastic material so that the interior of the geometric form can be observed once the shells have been assembled with the base members. The flanges 102 on the base members stop short of the peripheral rim 101 a distance sufficient to permit the ends of the walls of the shells to be received flush against the flat base surface of the base member within the peripheral flange 101. The shells of FIGS. 5–11 are seriatim: a cylinder, a cube, a square pyramid, a hemisphere, a cone, a triangular pyramid, and a triangular prism.

Figure 5:
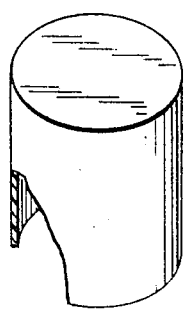
Figure 6:
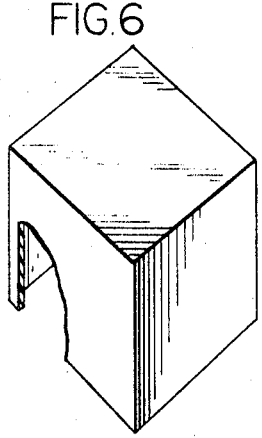
Figure 7:
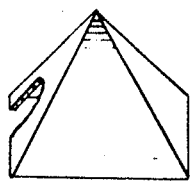
Figure 8:
Figure 9:
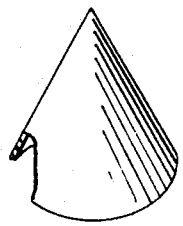
Figure 10:
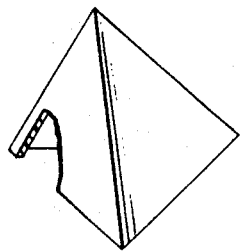
Figure 11:
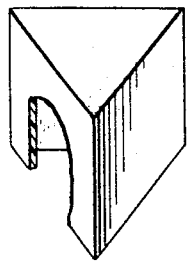

The shells of FIGS. 5, 8 and 9 have the same outer diameter at their open wall or end so that these three shells are interchangeably receivable within the peripheral flange 101 of the circular base member of FIG. 1. In like manner the open ends of the shells of FIGS. 6 and 7 are properly sized to be received within the peripheral flange 101 of the square base member of FIG. 2 and the open triangular ends of the shells of FIGS. 10 and 11 are both properly sized to be received within the peripheral flange 101 of the triangular base member of FIG. 3. In each case a snug fit can be provided if desired.

Figure 13:
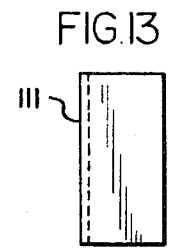
Figure 12:
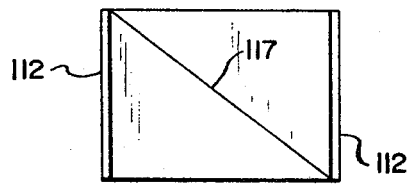
Figure 14:
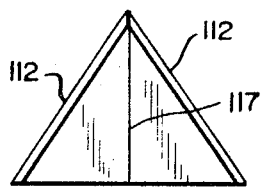
Figure 15:
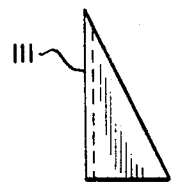
Figure 16:
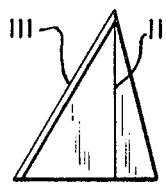
Figure 17:
Figure 18:
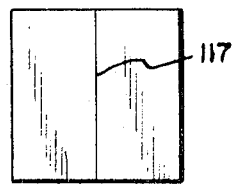
Figure 19:
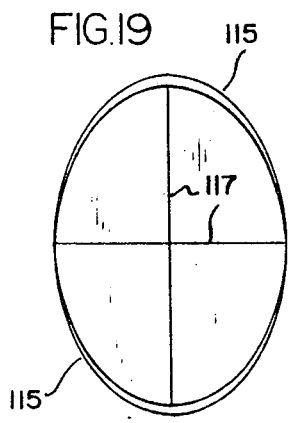
Figure 20:
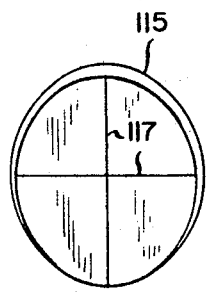
Figure 21:
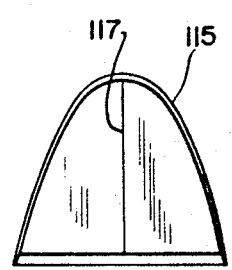
Figure 22:
Figure 23:
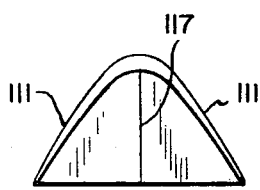
Figure 24:
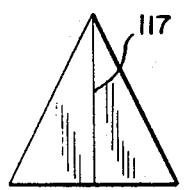
Figure 25:
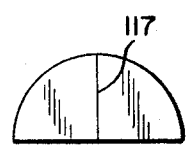
Figure 26:
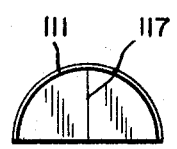

Suitable transparent plastic partitions for the solid geometric forms which can be assembled from the base members and shells of FIGS. 1–11 are illustrated in FIGS. 12–26. These partition members are specifically identified in the following table:

FIG. 12—Cube diagonal section
FIG. 13—Cube half section
FIG. 14—Square pyramid diagonal section
FIG. 15—Square pyramid half section
FIG. 16—Triangular pyramid section
FIG. 17—Prism section
FIG. 18—Cylinder section
FIG. 19—Cylinder elliptical section
FIG. 20—Cone elliptical section
FIG. 21—Cone parabolic section
FIG. 22—Hemisphere radial section
FIG. 23—Cone hyperbolic section
FIG. 24—Cone vertical section
FIG. 25—Hemisphere diametrical section
FIG. 26—Hemisphere small circle section Partition members of FIGS. 12–18 and 22–26 can be mounted on the respective base members by inserting their bottom edges within the proper channel 103. The proper channels 103 for use in each section in each solid geometric form will be apparent to those with even a little skill in the art of solid geometry from the above identifications of the respective partitions.

The partition members of FIGS. 12 and 14 are to form diagonal planes in a cube and a square pyramid respectively and accordingly the edges identified in these two figures at 112 are beveled to a 90 degree point as illustrated in FIG. 12a, and the edges 112 of the partitions of FIGS. 16 and 17 are similarly beveled to a 60 degree point to be received in a corner of a triangular pyramid or triangular prism respectively. The partitions of FIGS. 13, 15 and 22 each have one edge 111 beveled at a 45 degree slope for flush engagement at a 45 degree angle with the surface of another partition since these partitions are to be supported in groove 103c and engage a partition in groove 103a to simulate a plane intersecting another plane. A proper 45 degree bevel for such edges is illustrated in FIG. 13a.

The partition of FIG. 23 is hyperbolic and is to be mounted by its lower edge in the groove 103b of the circular base of FIG. 1 to simulate a vertical section through a cone. Accordingly the edge 111 is beveled properly for closer conformity with the wall of the right angle cone of FIG. 9. In FIG. 26, the edge 111 is beveled at about 60 degrees for closer conformity with the inner surface of the shell wall of the hemispherical shell of FIG. 8 since this partition is to be mounted in groove 103b of the circular base member of FIG. 1 as a vertical section through the hemisphere spaced parallel from a diameter.

FIGS. 19–21 illustrate partitions which are not received within the mounting grooves on the base members. The large elliptical section of FIG. 19 is for use in the cylinder of FIG. 5, while the smaller elliptical section of FIG. 20 and the parabolic section of FIG. 19 are for use in the cone of FIG. 9. In each of these, the edge 115 has a transitional bevel throughout the curved portion of the edge for proper and general conformity of the edge with the interior wall of the respective shell member when the partition member is in place as a section. The parabolic section of FIG. 21 also has a beveled straight edge at 111 for properly engaging the upper surface of the circular base member with the cone assembled on the base member.

The members of FIGS. 19–21 are for use as sections transverse to the vertical axis of the cylinder and cone and can be suitably supported on the base of the geometric form by resting thereon or can be supported by other partitions or by legs or pins (not shown).

It will be apparent from the foregoing that the members can be assembled to illustrate a variety of geometric forms and sections of these forms. Additionally, many of the partition members include linear marks at 117 for illustrating the relation of linear geometry to the solid forms. Also, edges of the partitions further illustrate such relation when the partitions and forms are assembled. Specifically, the lines 117 of FIGS. 14, 16, 17, 18 and 24 illustrate altitudes, the line 117 of FIG. 12 illustrates a diagonal and the line 117 of FIG. 25 illustrates a radius. The right-hand edges in FIGS. 15 and 16 and both edges of FIG. 24 are slant heights. Further, the triangular prism and cylindrical cover members are preferably no taller than the cube cover member so that the partition members for the triangular prism and cylindrical cover members can be contained within the cube cover member.

I claim:
1. A kit for use in student applied geometry experiments for teaching terminology and concepts of volume, dimension and sectioning of solid forms, which kit comprises base member means, transparent cover shell means for removably covering said base member means to form an enclosure having solid geometric nomenclature, planar geometric partition means for said enclosure and means for locating and removably mounting said partition means within the enclosure, wherein said base member means comprises a square base member, a round base member, and a triangular base member each having peripheral receiver means for interchangeably receiving a plurality of cover members;

said cover shell means including:
(1) a plurality of cover members of different geometric shapes each having a circular open side of the same size receivable by the round base member and fitting the receiver means of said round base member,
(2) a plurality of cover members each of a different geometric shape and each having a triangular open side of the same size receivable by the triangular base member and fitting the receiver means of said triangular base member, and
(3) a plurality of cover members for said square base each of a different geometric shape and each having a square open side of the same size receivable by the square base member and fitting the receiver means of said square base member.

2. The kit of claim 1 wherein locating and removably mounting means comprises groove means at the upper surface of each base member and vertical rib means in the groove means for gripping the planar geometric partition means.

3. The kit of claim 1 wherein the locating and mounting means of the round base member comprises a groove extending along the diameter of the round base, a second groove parallel to said first groove extending along a cord of the base and a third groove extending along a radius of the base at an angle to said first groove.

4. The kit of claim 1 wherein said partition means has a bevelled edge for engaging a corner of the cover means or for engaging a wall of the cover means at an angle.

5. The kit of claim 1 wherein the cover means for said round base comprises a conical cover member, a cylindrical cover member and a hemispherical cover member, the cover means for said triangular base comprises a triangular prism cover member and a triangular pyramid cover member and the cover means for said square base comprises a square pyramid cover member and a cube cover member.

6. The kit of claim 5 wherein said partition means comprises the triangular partition means for sectioning each of the triangular and conical cover members, a rectangular partition means for sectioning each of said prism, square, cube and cylindrical cover members, and partition means having curvilinear edges for conforming to the inner surface of an for partitioning each of said conical, hemispherical and cylindrical cover members, each of said partitions being of proper size to substantially meet the inner surface of the corresponding cover member with the partition located by said mounting means on the proper base member and with said corresponding cover member received by said proper base member.

References Cited

FOREIGN PATENTS 833,716   3/1952   Germany.

OTHER REFERENCES

Transparent Visual Aids. Brochure of Physics Research Laboratories, Inc., 4 p. 35–34. Received in Patent Office Nov. 7, 1960.

LAWRENCE CHARLES, Primary Examiner